United States Patent
Brown

(10) Patent No.: US 6,736,217 B2
(45) Date of Patent: May 18, 2004

(54) WEED, WEED ROOT AND ROOT VINE REMOVING, CULTIVATING TOOL

(76) Inventor: Charles Farrel Brown, 3710 S. Harris Dr., Baton Rouge, LA (US) 70816

( * ) Notice: Subject to any disclaimer, the term of this patent is extended or adjusted under 35 U.S.C. 154(b) by 0 days.

(21) Appl. No.: 10/074,632

(22) Filed: Jun. 12, 2002

(65) Prior Publication Data

US 2003/0230420 A1 Dec. 18, 2003

(51) Int. Cl.$^7$ ............................................. A01B 33/00
(52) U.S. Cl. ........................... 172/41; 172/25; 172/378; 172/111
(58) Field of Search ............................ 172/41, 25, 371, 172/378, 379, 381, 111; 7/114, 115; 30/500

(56) References Cited

U.S. PATENT DOCUMENTS

| | | | | |
|---|---|---|---|---|
| 2,082,476 A | * | 6/1937 | Allen | 172/25 |
| 2,680,643 A | * | 6/1954 | Cravotta | 294/50.6 |
| 3,129,771 A | * | 4/1964 | Lidstone | 172/25 |
| 3,198,719 A | * | 8/1965 | Stewart | 294/50.5 |
| 3,444,934 A | * | 5/1969 | Alberto | 172/25 |
| 3,554,293 A | * | 1/1971 | Aman et al. | 172/13 |
| 4,213,504 A | * | 7/1980 | Schneider | 172/25 |
| 4,603,744 A | * | 8/1986 | Ramirez | 172/25 |
| 4,618,003 A | * | 10/1986 | Hostetter | 172/25 |
| 5,060,997 A | * | 10/1991 | Plecki | 294/50.6 |
| 5,261,496 A | * | 11/1993 | Smotherman | 172/25 |
| 5,330,010 A | * | 7/1994 | Smotherman | 172/25 |
| 5,452,767 A | * | 9/1995 | Smotherman | 172/25 |
| 5,909,778 A | * | 6/1999 | Acosta et al. | 172/111 |
| 5,988,292 A | * | 11/1999 | Knotts | 172/41 |
| 6,050,344 A | * | 4/2000 | Larson et al. | 172/378 |
| 6,227,317 B1 | * | 5/2001 | Severns | 175/421 |
| 6,311,782 B1 | * | 11/2001 | Plasek et al. | 172/13 |
| 6,467,551 B1 | * | 10/2002 | Washek | 172/378 |

FOREIGN PATENT DOCUMENTS

| | | | | |
|---|---|---|---|---|
| DE | 3631436 | * | 4/1987 | 172/41 |
| FR | 1052462 | * | 9/1953 | 172/41 |

* cited by examiner

Primary Examiner—Victor Batson

(57) ABSTRACT

What I claim is new about my invention is that the double-edged plows on the ends of the plurel to tines (eight as shown) can cultivate and entangle weeds, weed roots and root vines in forward or reverse, will entangle the plural (eight as shown) of tines and double-edged plows with weeds, weed roots and root vines. When a given amount of weeds, weed roots and vines are entangled, stop rotation. Push down Sleeve 7 to have Sleeve 9 cut and push all debris off center pin and tines for removal of the collection of weeds, weed roots and vines.

1 Claim, 4 Drawing Sheets

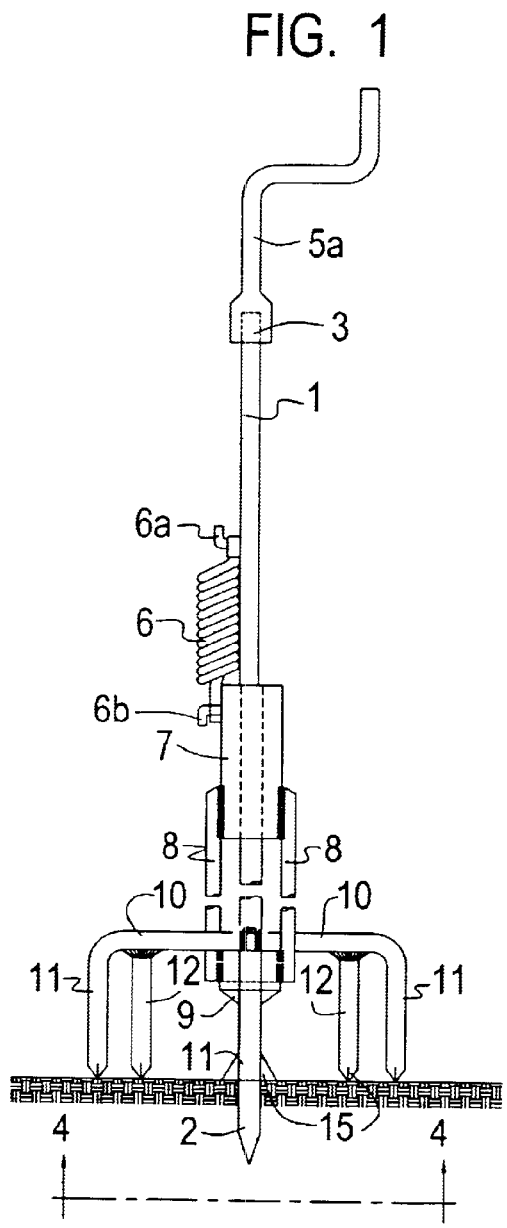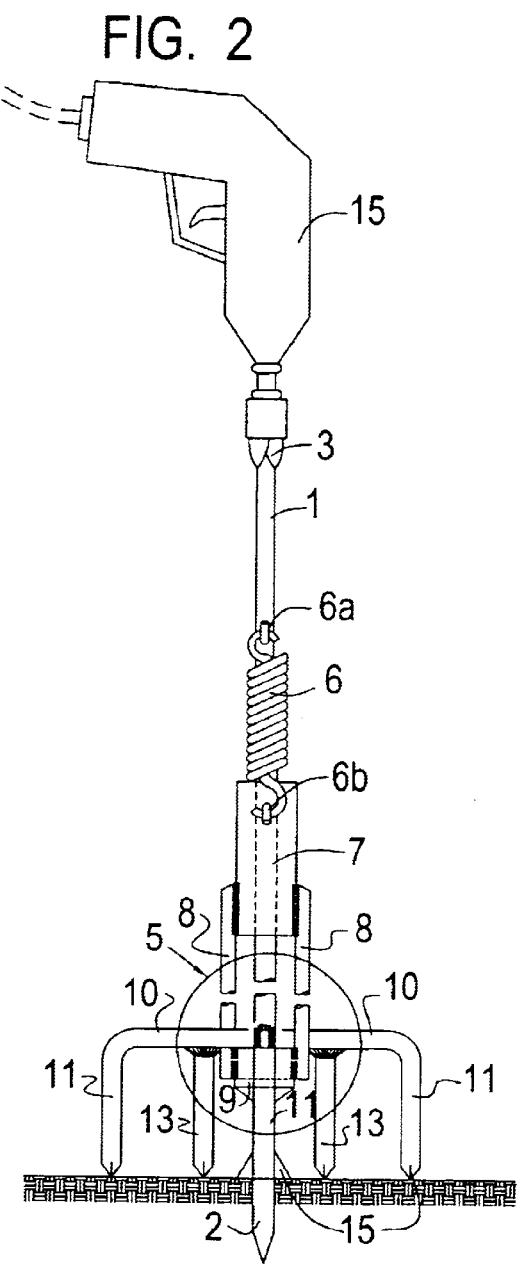

FIG. 8
FIG. 9
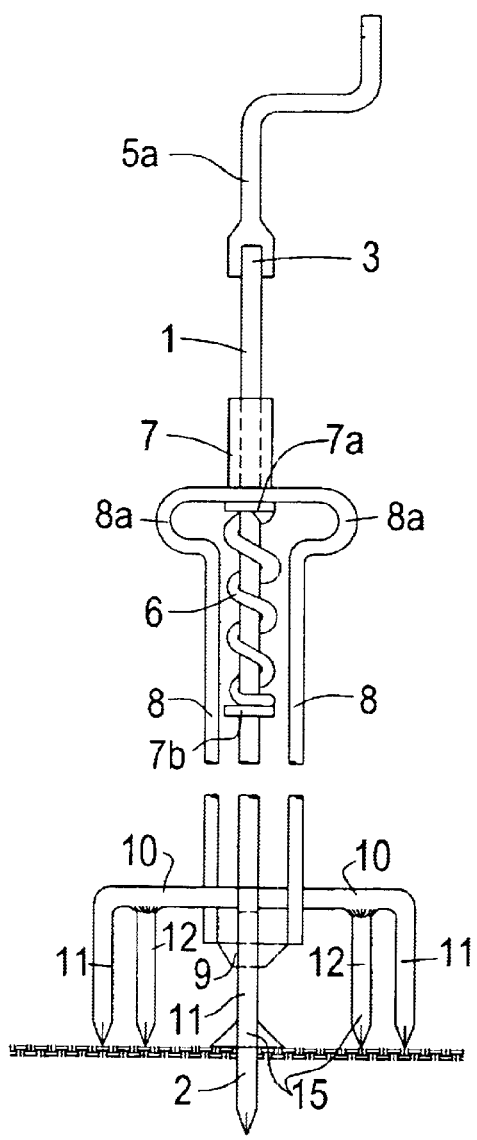
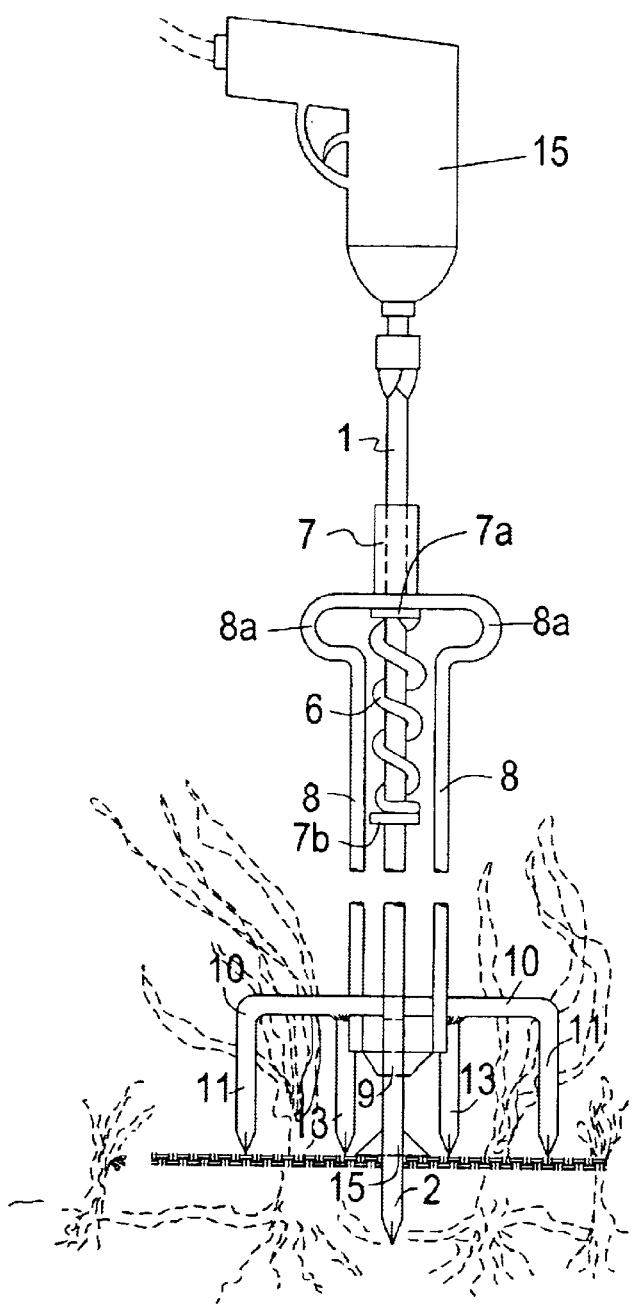

WEED, WEED ROOT AND ROOT VINE REMOVING, CULTIVATING TOOL

BACKGROUND OF THE INVENTION

This invention relates to cultivating tools, many types of cultivating tools for individual manual operation have been proposed. To use most of them the user must bend his or her back, squat, get down on his or her knees, or sit on the ground or a stool.

The short 12" to 14" sized hand held rake, shovel or hoe, will do just as good of a job of cultivating and extracting the weeds, weed roots and root vines but will exert much energy from the user.

SUMMARY OF THE INVENTION

It is the object of this invention to provide a cultivating tool which doesn't require the user to bend, squat, get down on knees or sit and move a stool.

It is the object of this invention to do the same weed, weed root, root vine removing and cultivating job as the above mentioned band held tools.

It is the object of this invention to remove from and around and in the flower beds or vegetable gardens any undesired uncultivated plants such as weeds, weed roots and root vines that tend to crowd out the desired crop.

It is the object of the invention to entwine a given amount of weeds, weed roots, and root vines on and around the center pin and the plurality of tines with their double-edge plows. A cutting sleeve mounted around the shank center pin and under the cross arms is affixed to a sleeve mounted around the shank above the cross arms by two rods with the sleeve above the cross arms held up by a spring. When the sleeve above cross arm is shoved down the shank it will cause the sleeve below the cross arms to cut and loosen the weeds, weed roots and root vines causing them to be pushed off the center prin. The weeds, weed roots and root vines should be collected in a container to be disposed of later.

It is the object of this invention to provide a hand tool crank or a source of power such as an electric drill which at high speeds cultivates the soil while entangling a given amount of weeds, weed roots and root vines to the cultivating tines and center pin. Pushing down said sleeve will rid the tool of the entangled debris.

BRIEF DESCRIPTION OF THE DRAWINGS

FIG. 1 is a side elevation of the present invention.

FIG. 2 is a side elevation of the present invention.

FIG. 8 is a side elevation of another embodiment of the invention.

FIG. 9 is another elevation of FIG. 8.

DETAILED DESCRIPTION OF THE PREFERRED EMBODIMENTS

Figure 3:
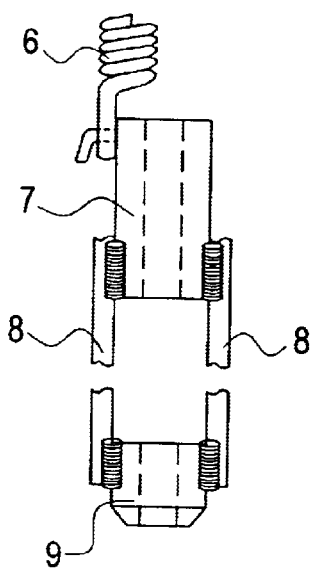
FIG. 3 is a partial view of the spring, push sleeve and cutting sleeve.
Figure 4:
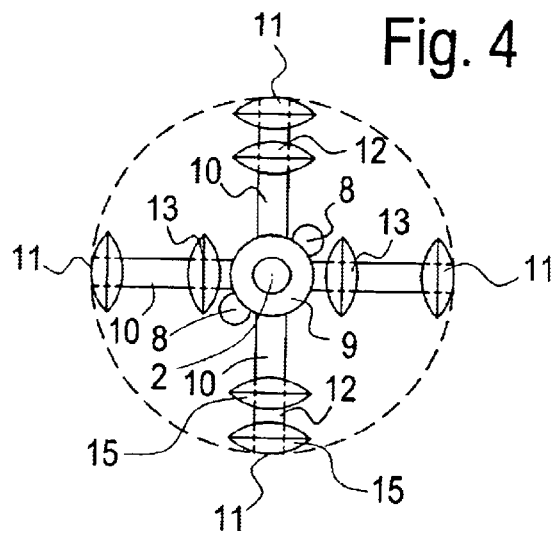
FIG. 4 is a sectional plan view of the tines and cross arms.
Figure 5:
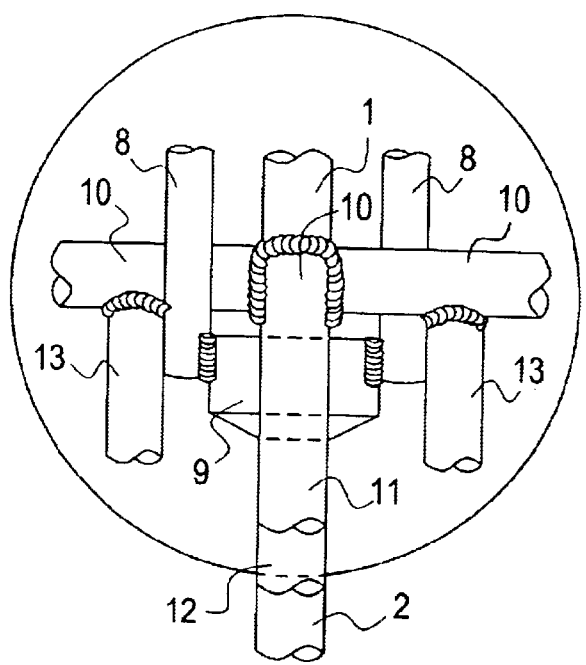
FIG. 5 is an exploded view of area 5 of FIG. 2.

FIG. 1 shows a side elevation of a tool in accordance with the invention with a hand crank 5-A with a socket coupling 3 to engage shank 1, The tool including one coil spring 6 and hooks 6-A and 6-B. Hook 6-A is affixed to shank 1. The other hook 6-B is affixed to the push down sleeve 7. Sleeve 7 is affixed to cutting sleeve 9 by two rods 8. Spring 6 is hooked to hooks 6-A & 6-B, thereby holding sleeve 9 up under cross arms 10.

As shown in FIGS. 1 & 2, sleeve 7 is positioned above cross arms 10, a distance comfortable for the user to operate the tool from a standing position.

As shown in FIGS. 1 & 2, sleeve 9 is positioned below cross arms 10 and is held up by spring 6 which is hooked to sleeve 7 & shank 1. Sleeve 7 and sleeve 9 are connected by the two rods 8. After rotation of shank 1 is stopped, the user can push down sleeve 7 so that the two rods 8 and sleeve 9 can cut, tear and loosen the entwined weeds, weed roots and root vines from the center pin 2. A plurality of the tines 11, 12 & 13 are affixed to the shank 1 adjacent to its end position 2. Eight tines are shown with double-edge plows 15 which cut a radius around shank 1. The double-edged plows 15 can entwine weeds, weed roots and root vines and cultivate in forward or reverse rotation. Tines 12 & 13 are staggered on the cross arms 10 to give more and easier cultivating.

FIG. 3 shows a partial view of spring 6 push down sleeve 7 to two rods 8 and cutting sleeve 9. The rods 8 & sleeve 9 cut, tear and loosen the entwined weeds, weed roots and root vines from the invention as shown in the drawings.

As shown in FIG. 2, the center pin holds the invention in one place, thereby reducing any damage to the wanted plants. The two rods 8 connect the top push down sleeve 7 to the bottom cutting sleeve 9. Cross arms 10 arc affixed perpendicular to the denter pin 2. Tines 11 are affixed to the outside of cross arms 10. Tines 13 are staggered and affixed to the inside of cross arms 10. All tines 11, 12 and 13 have a double-edge plow affixed to their bottom ends.

Figure 6:
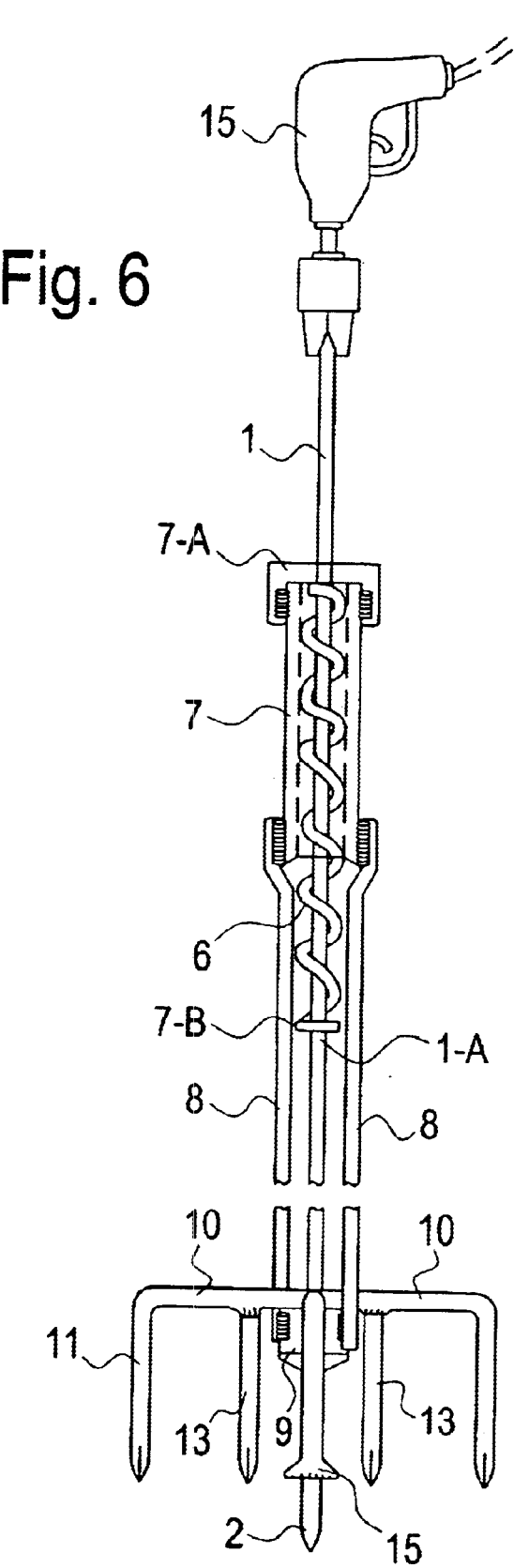
FIG. 6 is a side elevation of another embodiment of the present invention.

FIG. 6 shows a side elevation of another embodiment of the invention. The embodiment shown in FIG. 6 includes top sleeve 7, with spring 6 being enclosed in sleeve 7. A cap 7A holds spring 6 within sleeve 7. The bottom of spring 6 is held to shank 1 by a pin 1-A.

Figure 7:
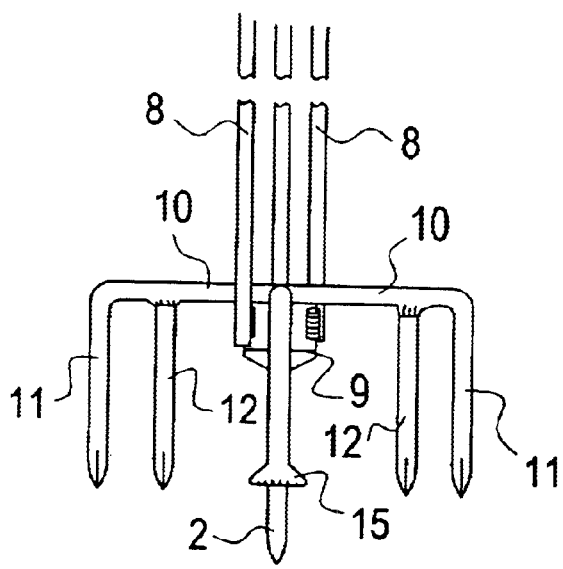
FIG. 7 is a partial elevation of the embodiment shown in FIG. 6.

FIGS. 7 and 8 show another embodiment of the invention with the spring being positioned between a top washer 7-A and a bottom washer 7-B. The bottom of spring 6 presses against washer 7-B that is affixed to shank 1. The two rods 8 have a bended shape 8-A and are affixed to sleeve 7 and top washer 7-A.

I claim:

1. A rotatable tilling and weeding device for cultivating ground material and extracting weeds, weed roots root vines, the device comprising:

(a) a rotatable shaft having an upper end, a middle section, a lower end, and having an axis of rotation extending from its upper end through its middle section to its lower end, the rotatable shaft further including a first hook directly mounted to said middle section, with said shaft upper end including a coupler for coupling the shaft upper end to a source of rotary force and said shaft lower end forming a center pin adapted to penetrate the ground material;

(b) a hollow push sleeve slideably mounted on the rotatable shaft and having an upper end and a lower end, with a second hook directly mounted to the hollow push sleeve upper end, and a plurality of connecting rods directly mounted to the hollow push sleeve lower end, the hollow push sleeve positioned above a plurality of cross arms that extend perpendicularly from said center pin;

(c) a spring having an upper end directly mounted on the first hook, and a lower end directly mounted to the second hook;

(d) a hollow cutting sleeve slideably mounted to the lower end of the rotatable shaft, said hollow cutting sleeve directly mounted to said plurality of rods and positioned below said plurality of cross arms;

(e) a plurality of ground tilling tines affixed to the rotatable shaft lower end, said tines extending downwardly from said cross arms and adapted to penetrate the ground material;

(f) said source of rotary force causing said shaft to rotate, thereby cultivating the ground material and entwining said weeds or roots, with the hollow cutting sleeve in combination with the hollow push sleeve and the plurality of connecting rods, being adapted to slide along a longitudinal axis of the rotatable shaft and extract entangled weeds or roots.

* * * * *